United States Patent
Gruenig et al.

(10) Patent No.: US 12,092,469 B2
(45) Date of Patent: Sep. 17, 2024

(54) METHOD FOR PREPARING A MOTOR VEHICLE FOR A JOURNEY

(71) Applicant: Bayerische Motoren Werke Aktiengesellschaft, Munich (DE)

(72) Inventors: Andreas Gruenig, Munich (DE); Johannes Mueller, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 77 days.

(21) Appl. No.: 17/763,091

(22) PCT Filed: Jul. 17, 2020

(86) PCT No.: PCT/EP2020/070254
§ 371 (c)(1),
(2) Date: Mar. 23, 2022

(87) PCT Pub. No.: WO2021/069122
PCT Pub. Date: Apr. 15, 2021

(65) Prior Publication Data
US 2022/0373345 A1 Nov. 24, 2022

(30) Foreign Application Priority Data
Oct. 9, 2019 (DE) .............. 10 2019 127 078.2

(51) Int. Cl.
*G01C 21/34* (2006.01)
*G01C 21/36* (2006.01)

(52) U.S. Cl.
CPC ..... *G01C 21/3469* (2013.01); *G01C 21/3664* (2013.01); *G01C 21/3688* (2013.01)

(58) Field of Classification Search
CPC ............ G01C 21/3469; G01C 21/3664; G01C 21/3688
See application file for complete search history.

(56) References Cited

U.S. PATENT DOCUMENTS

2013/0090845 A1   4/2013  Wakayanagi et al.
2014/0365124 A1*  12/2014 Vulcano ............. G06F 16/951
                                          707/706
(Continued)

FOREIGN PATENT DOCUMENTS

CN    101451853 A    6/2009
CN    102538809 A    7/2012
(Continued)

OTHER PUBLICATIONS

International Search Report corresponding to International Patent Application No. PCT/EP2020/070254, dated Nov. 24, 2020 (7 pages).

(Continued)

*Primary Examiner* — Alan D Hutchinson
(74) *Attorney, Agent, or Firm* — Maginot, Moore & Beck LLP

(57) ABSTRACT

A method for preparing a motor vehicle for a journey includes recording, using a mobile electronic device, at least one piece of first information, which is representative of at least one piece of journey information, before the journey, and ascertaining a piece of second information that is representative of at least one actual state of the motor vehicle. The method also includes determining at least one piece of preparatory information on the basis of the first information and the second information. The method further includes displaying the preparatory information on the mobile electronic device in order to prepare the motor vehicle.

18 Claims, 3 Drawing Sheets

(56) References Cited

U.S. PATENT DOCUMENTS

| | | | |
|---|---|---|---|
| 2015/0345984 A1* | 12/2015 | Graham | G01C 21/3697 701/400 |
| 2018/0038704 A1 | 2/2018 | Nilsson et al. | |
| 2018/0143029 A1 | 5/2018 | Nikulin et al. | |
| 2018/0304765 A1 | 10/2018 | Newman et al. | |

FOREIGN PATENT DOCUMENTS

| | | |
|---|---|---|
| CN | 103438894 A | 12/2013 |
| CN | 104973057 A | 10/2015 |
| CN | 105383496 A | 3/2016 |
| CN | 106904085 A | 6/2017 |
| CN | 109661629 A | 4/2019 |
| CN | 110304066 A | 10/2019 |
| DE | 102010043682 A1 | 5/2012 |
| DE | 102013220208 A1 | 10/2013 |
| WO | 2014151153 A2 | 9/2014 |
| WO | 2014151155 A1 | 9/2014 |
| WO | 2019063699 A1 | 4/2019 |

OTHER PUBLICATIONS

German Search Report corresponding to German Patent Application No. 10 2019 127 078.2, dated Jul. 2, 2020 (6 pages).

Chinese Office Action corresponding to Chinese Patent Application No. 202080066711.2, dated Mar. 19, 2024 (13 pages).

English Translation of Chinese Office Action corresponding to Chinese Patent Application No. 202080066711.2, dated Mar. 19, 2024 (9 pages).

Chinese Office Action corresponding to Chinese Patent Application No. 202080066711.2, dated Jul. 19, 2023 (9 pages).

English Translation of Chinese Office Action corresponding to Chinese Patent Application No. 202080066711.2, dated Jul. 19, 2023 (8 pages).

English Machine Translation of CN101451853A. (6 Pages).

* cited by examiner

METHOD FOR PREPARING A MOTOR VEHICLE FOR A JOURNEY

The present application is the U.S. national phase of PCT Application PCT/EP2020/070254 filed on Jul. 17, 2020, which claims priority of German patent application No. 102019127078.2 filed on Oct. 9, 2019, which is incorporated herein by reference in its entirety.

TECHNICAL FIELD

The present disclosure is directed to methods and apparatus for preparing a motor vehicle for a journey

BACKGROUND

One object to be achieved consists of specifying a method that is used to prepare a motor vehicle particularly well. Furthermore, an apparatus, a motor-vehicle and a computer program that are able to perform such a method are intended to be specified. In addition, a computer-readable storage medium containing the computer program is intended to be specified.

SUMMARY

These objects are achieved by the methods and apparatus disclosed herein. Advantageous exemplary configurations, implementations and developments are furthermore disclosed.

First, the method for preparing a motor vehicle for a journey will be explained.

According to at least one embodiment of the method, at least one piece of first information, which is representative of at least one piece of journey information, is recorded by a mobile electronic device before the journey. The mobile electronic device is preferably a smartphone. Alternatively, the mobile electronic device may be a tablet PC or a smart speaker.

By way of example, the mobile electronic device records a departure time and/or an arrival location for the journey. In this case, the journey information comprises the departure time and/or the arrival location as first information.

By way of example, the first information is input into the mobile electronic device by a user of the motor vehicle before the journey. The user of the motor vehicle preferably inputs the journey information into the mobile electronic device before the journey. The input is preferably made by way of a voice input using the smartphone or the smart speaker, in order to allow the most intuitive form of communication for the user. Preferably, the user of the motor vehicle is the driver of the motor vehicle. Alternatively, the user of the motor vehicle may be a passenger. Additionally, it is possible for the user of the motor vehicle not to travel on the journey by the motor vehicle.

By way of example, the user of the motor vehicle inputs a departure time and/or an arrival location for the journey into the mobile electronic device. In this case, the journey information comprises the departure time and/or the arrival location as first information.

According to at least one embodiment of the method, a piece of second information is ascertained, which is representative of at least one actual state of the motor vehicle. The actual state of the motor vehicle represents the actual state of the motor vehicle at the time of ascertainment of the second information.

By way of example, a tire pressure of the motor vehicle is ascertained in this embodiment. In this case, the actual state of the motor vehicle comprises the tire pressure of the motor vehicle as second information.

According to at least one embodiment of the method, at least one piece of preparatory information is determined on the basis of the first information and the second information.

The preparatory information is preferably not determined on the mobile electronic device. The first information and the second information are preferably transmitted to an external apparatus, in particular a remote server. The external apparatus is thus preferably designed to determine the preparatory information.

The first information and the second information are preferably transmitted to the external apparatus by way of a telecommunication network in each case. The external apparatus is preferably not part of the motor vehicle or of the mobile electronic device in this instance. That is to say that the external apparatus is not embedded and/or integrated in the motor vehicle or in the mobile electronic device, but rather is arranged physically separately from the motor vehicle and the mobile electronic device.

According to at least one embodiment of the method, the preparatory information is displayed on the mobile electronic device in order to prepare the motor vehicle. The preparatory information is preferably transmitted from the external apparatus to the mobile electronic device. The preparatory information is furthermore preferably transmitted from the external apparatus to the mobile electronic device by way of the telecommunication network.

According to at least one embodiment of the method, the preparatory information comprises a route for the journey. The route is preferably generated on the basis of the first and the second information. This route is preferably displayed on the mobile electronic device.

Furthermore, the preparatory information can comprise at least one piece of information that can be used to travel on this route particularly well.

The preparatory information preferably allows the user of the motor vehicle to make changes to the actual state of the motor vehicle. Alternatively or additionally, the external apparatus can preferably use change signals to make changes to the actual state of the motor vehicle on the basis of the preparatory information.

By way of example, the preparatory information comprises information according to which the tire pressure of the motor vehicle should be changed so that an interruption to the journey along the route in order to fill a tank of the motor vehicle and/or to charge a battery of the motor vehicle can advantageously be avoided. The battery is preferably provided as an energy source for an engine of the motor vehicle in this instance.

In at least one embodiment, the method for preparing a motor vehicle for a journey comprises a step in which at least one piece of first information, which is representative of at least one piece of journey information, is recorded by a mobile electronic device before the journey. Furthermore, the method comprises the step in which a piece of second information, which is representative of at least one actual state of the motor vehicle, is ascertained. Furthermore, the method in this embodiment comprises the step in which at least one piece of preparatory information is determined on the basis of the first information and the second information. Moreover, the method comprises the step in which the preparatory information is displayed on the mobile electronic device in order to prepare the motor vehicle.

The method steps listed above are preferably performed in the order indicated in the previous paragraph.

One notion of the method described in the present case is, among other things, to determine a piece of preparatory information for a motor vehicle and to display it to the driver so that the driver can better prepare the motor vehicle for the journey. Advantageously, the journey can thus be made particularly efficiently.

According to at least one embodiment of the method, a piece of third information is provided, which is representative of at least one piece of path information. The path information preferably comprises traffic data and/or weather data along the route.

The third information is preferably provided by the external apparatus, in particular the remote server. Alternatively, it is possible for the third information to be transmitted to the external apparatus, in particular to the remote server, by the telecommunication network.

According to at least one embodiment of the method, the preparatory information is determined on the basis of the third information. The preparatory information is preferably determined on the basis of the first information, the second information and the third information. In this embodiment, the preparatory information is preferably determined on the basis of the journey information, the actual state of the motor vehicle and the path information.

According to at least one embodiment of the method, the route for the journey is provided to a navigation apparatus of the motor vehicle. The navigation apparatus preferably comprises a display apparatus designed to display the route. The navigation apparatus furthermore preferably comprises at least one locating system designed to locate a position of the motor vehicle on the route.

According to at least one embodiment, the mobile electronic device is not embedded and/or integrated in the motor vehicle. The mobile electronic device is preferably not part of the motor vehicle. The mobile electronic device can preferably record the first information at a physical distance from the motor vehicle.

By way of example, the user is at a different location than the motor vehicle when inputting the first information before the journey begins. By way of example, the user is in a living room and the motor vehicle is in a garage.

According to at least one embodiment of the method, at least one intermediate question is determined when determining the preparatory information. The intermediate question is preferably determined on the basis of the first information, the second information and/or the third information. Furthermore, the intermediate question is preferably transmitted to the mobile electronic device by the telecommunication network.

According to at least one embodiment, the intermediate question is output by the mobile electronic device. Preferably, the intermediate question is output by the mobile electronic device by voice output. In this case, the mobile electronic device preferably comprises a voice output unit, and so the mobile electronic device outputs the intermediate question by voice output. Alternatively or additionally, the intermediate question can be displayed on a display apparatus of the mobile electronic device.

The intermediate question for example comprises a question to the user of the motor vehicle in order to clarify the journey information. By way of example, the intermediate question comprises a question regarding whether the user of the motor vehicle wishes to interrupt the journey along the route.

According to at least one embodiment of the method, the mobile electronic device records at least one further piece of first information, which is representative of a further piece of journey information. By way of example, the user of the motor vehicle inputs the further first information that is representative of a further piece of journey information into the mobile electronic device.

The further first information is preferably transmitted to the external apparatus, in particular to the remote server, by the telecommunication network.

The further first information is preferably a response to the intermediate question, for example by the user of the motor vehicle. By way of example, the user inputs the further first information into the mobile electronic device as a response to the intermediate question regarding whether the user of the motor vehicle wishes to interrupt the journey along the route. In this case, the further first information comprises for example a piece of location-related information regarding where the interruption to the journey is located on the route.

According to at least one embodiment of the method, the preparatory information is determined on the basis of the first information, the second information and the further first information. Preferably, the preparatory information is determined on the basis of the first information, the second information, the third information and the further first information.

The preparatory information is preferably determined on the basis of a predefined information threshold in this instance. The predefined information threshold preferably indicates whether sufficient recorded, provided and/or ascertained collective information is available. The collective information here preferably comprises the first information, the further first information, the second information and/or the third information. If this predefined information threshold is not reached, at least one intermediate question is preferably determined.

The predefined information threshold is preferably predefinable. By way of example, it is possible to predefine that the predefined information threshold comprises at least one arrival location, a piece of information about an interruption to the journey along the route and an arrival time.

If the electronic mobile device records for example only an arrival location and an arrival time, for example by way of an input by the user, then the collective information comprises the arrival location and the arrival time. In this case, the collective information does not correspond to the information of the predefined information threshold. In this case, an intermediate question is determined. In this case, the intermediate question is whether an interruption to the journey along the route is wanted. As a response to the intermediate question, the mobile electronic device records the further first journey information, for example by way of an input by the user. The further first journey information can be for example the indication that an interruption to the journey along the route is not wanted. After the further first journey information has been recorded, the predefined information threshold has been reached and the preparatory information is generated.

Furthermore, it is possible for a multiplicity of intermediate questions to be determined. In this case, the mobile electronic device records a multiplicity of further pieces of first journey information, for example by way of input by the user. Preferably, the mobile electronic device records a single further piece of first journey information for each intermediate question as a response to a single intermediate question. By way of example, for each intermediate question, the user of the motor vehicle inputs a single further piece of first journey information into the mobile electronic device as a response to a single intermediate question.

According to at least one embodiment of the method, the journey information and/or the further journey information is recorded by the mobile electronic device by voice input. By way of example, the journey information and/or the further journey information is input into the mobile electronic device by the user of the motor vehicle by voice input. The mobile electronic device preferably comprises a voice recognition unit, and so the mobile electronic device is controllable by voice control by way of the voice input.

According to at least one embodiment of the method, the journey information is information that clarifies the journey. By way of example, the journey information provides information about a departure time, that is to say a time at which the journey begins, about an arrival time, that is to say a time at which the journey ends, about an interruption to the journey or about the route of the journey. Furthermore, the journey information provides for example information about a departure location, that is to say a location at which the journey begins, or about an arrival location, that is to say a location at which the journey ends. In other words, the journey information comprises one or more of the following pieces of information: departure information, arrival information, information about an interruption to the journey, route information. Furthermore, the further journey information preferably comprises one or more of the following pieces of information: departure information, arrival information, information about an interruption to the journey, route information.

The information about an interruption to the journey along the route preferably comprises at least one piece of information regarding whether an interruption to the journey along the route is planned, for example by the user. If an interruption to the journey along the route is planned, then the information about an interruption to the journey along the route preferably comprises at least one piece of location-related interruption information and/or at least one piece of time-related interruption information.

Additionally, the journey information can comprise one or more of the following pieces of information: fast route, effective route, scenically particularly attractive route. In the case of the fast route, the route is preferably adapted for a minimal travelling time. In the case of the effective route, the route is preferably adapted for a particularly low power consumption and/or fuel consumption.

According to at least one embodiment of the method, the second information comprises one or more pieces of information about the following parameters of the motor vehicle: battery charge, fuel fill level, effective power consumption, effective fuel consumption, tire pressure, interior temperature, existing accessories, location data. If the motor vehicle comprises a battery as the energy source for an engine of the motor vehicle, for example, the battery has the battery charge. The second information can preferably be transmitted by way of a sensor unit. The sensor unit is preferably integrated in the motor vehicle here.

The battery charge, the fuel fill level, the tire pressure and the interior temperature can preferably be ascertained directly by way of a respective sensor of the sensor unit.

Furthermore, the power consumption and/or the fuel consumption for each journey by the motor vehicle can be ascertained by means of the sensors that ascertain the battery charge and/or the fuel fill level. If the battery charge and/or the fuel fill level are/is linked with a length of a completed journey, the power consumption and/or the fuel consumption of each completed journey can be calculated. The effective power consumption and/or the effective fuel consumption are/is preferably ascertained by way of a mean value calculation for the power consumption and/or the fuel consumption of completed journeys within a time interval. The time interval comprises at least one day before the journey, for example.

The location data of the motor vehicle are preferably ascertained by means of a GPS sensor. The location data of the motor vehicle correspond to a location, in particular the departure location, of the motor vehicle in this instance. Preferably, the departure location is ascertained by the GPS sensor, and so the departure location does not need to be recorded by the mobile electronic device.

The existing accessories may be for example a roof rack, a roof box, a bicycle rack, a rear rack and/or a trailer.

The preparatory information here comprises, for example on the basis of the second information, information that the user of the motor vehicle should increase the tire pressure. Furthermore, the preparatory information can comprise, on the basis of the second information, at least one further piece of information that the user of the motor vehicle removes existing accessories on the motor vehicle before the journey.

According to at least one embodiment of the method, the path information comprises one or more of the following pieces of information: traffic data, weather data. The traffic data and/or the weather data can be in particular traffic forecasts and/or weather forecasts. The traffic forecasts are for example a prediction of parameters of traffic streams, such as for example traffic density and/or traffic velocity, along the route. The weather forecasts are for example a prediction about parameters of the weather, such as for example probability of precipitation, occurrence of fog, occurrence of frost, along the route.

The traffic forecasts and/or weather forecasts are preferably determined on the basis of the first information. That is to say that the traffic forecasts and/or weather forecasts are preferably determined for a period of time between the departure time and the arrival time.

By way of example, the external apparatus can use the change signals to make changes to the actual state of the motor vehicle on the basis of the preparatory information, which here is in turn dependent on the third information, in particular a weather forecast. In this case, the external apparatus is advantageously designed to regulate the interior temperature of the motor vehicle to a desired temperature before the journey begins.

According to at least one embodiment of the method, the preparatory information is geared to increasing a range of the motor vehicle for the journey. By way of example, the preparatory information comprises information regarding how the actual state of the motor vehicle can be advantageously changed by the user of the motor vehicle so that the range can be increased.

The preparatory information preferably prompts the user of the motor vehicle to increase the tire pressure and/or to remove existing accessories. The range of the motor vehicle can thus be advantageously increased by the preparatory information.

In addition, an apparatus for preparing a motor vehicle for a journey is specified, wherein the apparatus is designed to carry out the method described here. All of the features and embodiments disclosed in relation to the method are thus also disclosed in relation to the apparatus, and vice versa.

According to at least one embodiment, the apparatus comprises a sensor unit designed to ascertain the actual state of the motor vehicle. Preferably, the sensor unit is embedded and/or integrated in the motor vehicle. In particular, the sensor unit is designed to ascertain the following parameters of the motor vehicle: battery charge, fuel fill level, power consumption, fuel consumption, tire pressure, interior temperature and/or existing accessories.

Furthermore, the apparatus can comprise a telecommunication unit. The telecommunication unit is preferably designed to transmit the second information to the external apparatus.

Further, the mobile electronic device can comprise a telecommunication unit that is preferably designed to transmit the first information to the external apparatus. Furthermore, the telecommunication unit of the mobile electronic device is preferably designed to receive the preparatory information from the external apparatus.

In addition, a motor vehicle that has the apparatus described here is specified. All of the features and embodiments disclosed in relation to the apparatus are thus also disclosed in relation to the motor vehicle, and vice versa.

According to at least one embodiment, the motor vehicle comprises a battery as the energy source for an engine of the motor vehicle. Preferably, the motor vehicle comprises exclusively a battery as the energy source for the engine of the motor vehicle. In other words, the motor vehicle in this embodiment is driven only electrically. In this case, the motor vehicle is an electric vehicle that is driven exclusively electrically.

Furthermore, it is possible for the motor vehicle to comprise a fuel tank containing fuel as the energy source for an internal combustion engine of the motor vehicle. The fuel is for example a fossil fuel, such as gasoline, diesel or gas. By way of example, the motor vehicle comprises exclusively fuel as the energy source for the internal combustion engine of the motor vehicle. Alternatively, it is possible for the motor vehicle to comprise a battery and fuel as the energy source. In this case, it is a hybrid motor vehicle.

Alternatively, it is possible for the motor vehicle to have exclusively an internal combustion engine as the drive.

Moreover, a computer program comprising instructions that, when the computer program is executed by a computer, cause said computer to perform the method described here is specified.

Furthermore, a computer-readable storage medium on which the computer program described here is stored is specified.

BRIEF DESCRIPTION OF THE DRAWINGS

Exemplary embodiments are explained more thoroughly below on the basis of the schematic drawings, in which.

DETAILED DESCRIPTION

Elements having the same design or function are denoted by the same reference signs across the figures.

Figure 1:
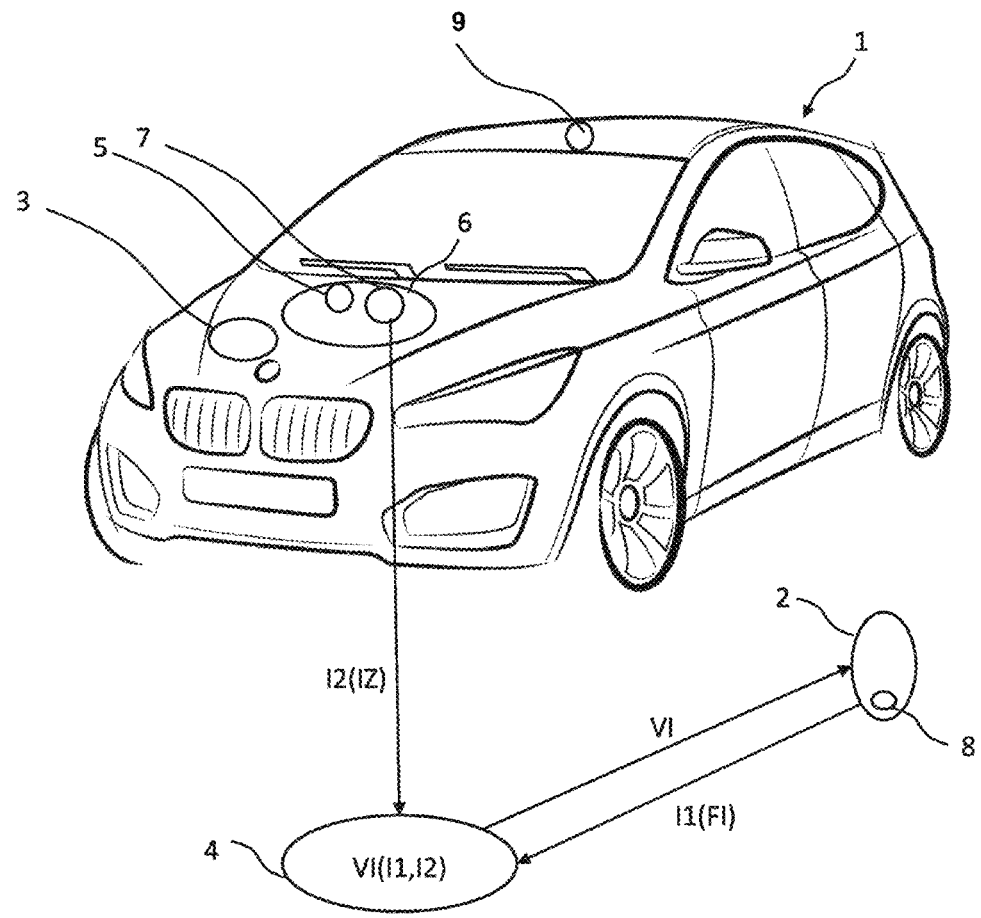
FIG. 1 shows a schematic representation of a motor vehicle described here according to an exemplary embodiment.

The motor vehicle 1 according to the exemplary embodiment of FIG. 1 comprises an apparatus 6, having a sensor unit 5 designed to ascertain the actual state IZ of the motor vehicle 1. Furthermore, the apparatus 6 in this exemplary embodiment comprises a telecommunication unit 7. Moreover, the motor vehicle 1 comprises a navigation apparatus 9.

The motor vehicle 1 is an electric vehicle that is driven exclusively electrically. That is to say that the motor vehicle 1 comprises a battery 3 as the energy source for an engine of the motor vehicle 1.

The telecommunication unit 7 of the apparatus 6 is used to transmit the actual state IZ of the motor vehicle 1 to an external apparatus 4, which is in particular a remote server.

In order to prepare for a journey, a first piece of information I1 is recorded by a mobile electronic device 2. The mobile electronic device 2 is not integrated in the motor vehicle 1 in this instance. Furthermore, the first information I1 is transmitted to the external apparatus 4, in particular to the remote server, by way of a telecommunication unit 8 of the mobile electronic device 2.

On the external apparatus 4, it is then possible to determine a piece of preparatory information VI on the basis of the first information I1 and the second information I2. In this instance, at least one piece of preparatory information VI is determined on the basis of the first information I1 and the second information I2 and is displayed on the mobile electronic device 2 in order to prepare the motor vehicle 1.

In this exemplary embodiment, the preparatory information VI comprises a route for the journey, which is provided to the navigation apparatus 9 of the motor vehicle 1.

Furthermore, a third piece of information I3 can be provided by the apparatus 6. In this case, the third information I3 is transmitted to the external apparatus 4 by way of the telecommunication unit 7 of the apparatus 6. Alternatively, the third information I3 can be provided by the mobile electronic device 2. In this case, the third information I3 is transmitted to the external apparatus 4 by way of the telecommunication unit 8 of the mobile electronic device 2. Alternatively, the third information I3 is provided by the external apparatus 4.

Figure 2:
FIG. 2 shows a schematic representation of an apparatus described here according to an exemplary embodiment.

The apparatus 6 according to the exemplary embodiment of FIG. 2 comprises a sensor unit 5, which in particular has a multiplicity of sensors. The multiplicity of sensors are used to ascertain the actual state IZ of the motor vehicle 1. Furthermore, the apparatus 6 comprises a telecommunication unit 7.

Figure 3:
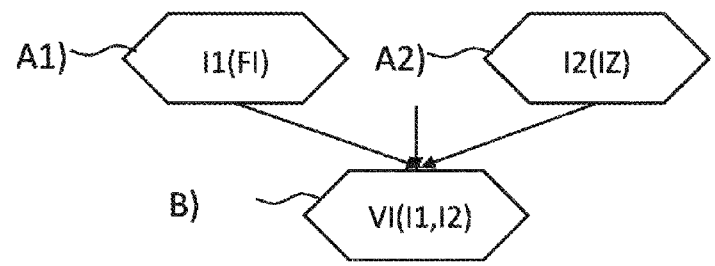
FIG. 3 shows a flowchart of a method described herein according to an exemplary embodiment.

In the flowchart for the method according to the exemplary embodiment of FIG. 3, a step A1 is first performed, in which a first piece of information I1, which is representative of a piece of journey information FI, is provided. In this exemplary embodiment, the journey information FI comprises at least one piece of arrival information and a piece of intermediate information. The arrival information in this instance comprises an arrival location and an arrival time. The intermediate information comprises an intermediate stop location. The arrival location and the arrival time are input into a mobile electronic device 2 by the user of the motor vehicle 1 by voice input, for example (see FIG. 1).

In a further step, a step A2 is performed, in which a second piece of information I2, which is representative of at least one actual state IZ of the motor vehicle 1, is ascertained. In this exemplary embodiment, the motor vehicle 1 furthermore comprises at least one sensor unit 5 (see FIG. 1) that is used to ascertain the actual state IZ of the motor vehicle 1. Here, the actual state IZ comprises a tire pressure, a battery charge, the power consumption and location data, in particular the present location, of the motor vehicle 1.

Subsequently, in step B, at least one piece of preparatory information VI is ascertained on the basis of the first information I1 and the second information I2.

In this exemplary embodiment, the preparatory information VI is ascertained on the basis of the arrival location, the arrival time, the battery charge, the power consumption, the tire pressure and the present location.

The ascertained preparatory information VI is then displayed on the mobile electronic device 2 in order to prepare the motor vehicle 1. In this exemplary embodiment, the preparatory information VI comprises an optimized route from the present location to the arrival location. The optimized route is geared for an increase in a range of the motor vehicle 1 for the journey. Furthermore, the preparatory information VI comprises a piece of information that the user of the motor vehicle 1 should increase the tire pressure of the motor vehicle 1. An increased tire pressure of the motor vehicle 1 leads to a lower power consumption and/or fuel consumption. An additional interruption to the journey along the route could thus be advantageously avoided.

Figure 4:
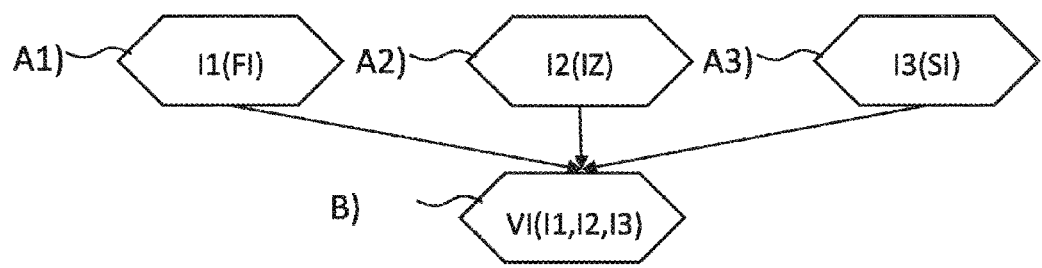
FIG. 4 shows a flowchart of a method described herein according to a second exemplary embodiment.

In contrast to the flowchart for the method according to the exemplary embodiment of FIG. 3, the flowchart for the method according to the exemplary embodiment of FIG. 4 comprises a further step A3, in which a third piece of information I3, which is representative of at least one piece of path information SI, is provided. In this exemplary embodiment, the path information SI comprises a weather forecast during the journey.

In a subsequent step B, the preparatory information VI is determined on the basis of the first information I1, the second information I2 and the third information I3. Here, the preparatory information VI is ascertained on the basis of the arrival location, the arrival time, the battery charge, the power consumption, the tire pressure, the present location and the weather forecast.

The preparatory information VI displayed on the mobile electronic device 2 comprises, among other things, an optimized route from the present location to the arrival location, wherein a region in which it is probably raining very heavily is bypassed. The bypass means that the journey is effectively faster.

Furthermore, it is possible that a very high outside temperature is forecast for another region, which preferably corresponds to the departure location. The external apparatus 4 is then designed for example to switch on an air-conditioning system of the motor vehicle 1 by means of change signals before the journey begins in order to reduce the interior temperature of the motor vehicle 1 before the journey, so that the user of the motor vehicle 1 can advantageously get into an air-conditioned motor vehicle 1 when the journey begins.

Figure 5:
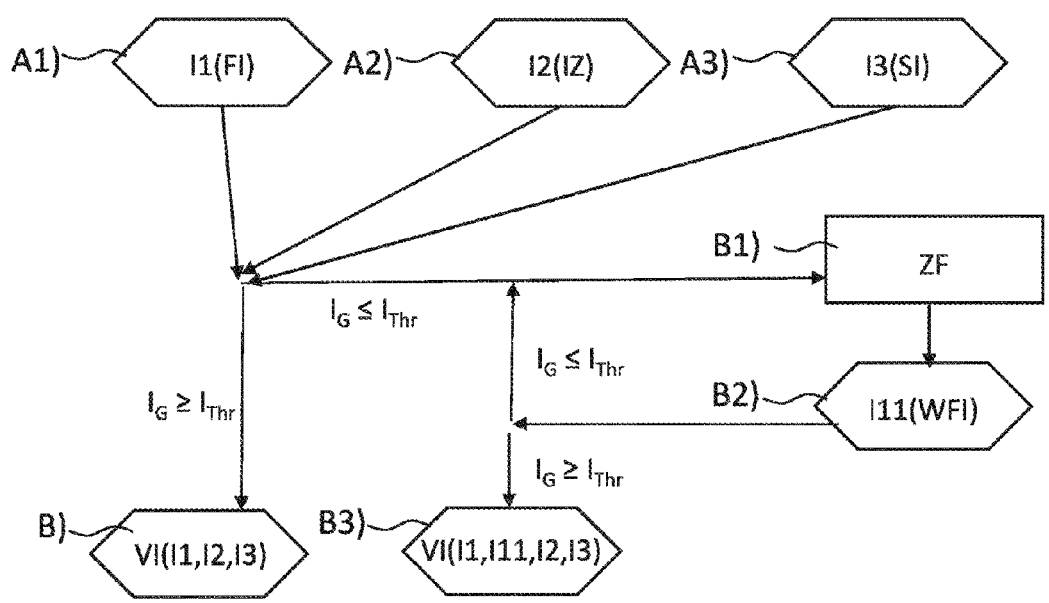
FIG. 5 shows a flowchart of a method described herein according to a third exemplary embodiment.

In contrast to the flowchart for the method according to the exemplary embodiment of FIG. 4, the flowchart for the method according to the exemplary embodiment of FIG. 5 comprises a further step B1, in which at least one intermediate question ZF is determined when determining the preparatory information VI.

Here, the preparatory information VI is determined on the basis of a predefined information threshold $I_{Thr}$. The predefined information threshold $I_{Thr}$ indicates whether sufficient first information I1, in particular collective information $I_G$, is available so that the preparatory information VI can be determined particularly effectively. The collective information $I_G$ here comprises the first information I1 or the first information I1 and the further first information I11. If the collective information $I_G$ is above the predefined information threshold $I_{Thr}$, the preparatory information VI is displayed on the mobile electronic device 2 in step B.

If this predefined information threshold $I_{Thr}$ is not reached, then at least one intermediate question ZF is determined in step B1. The intermediate question ZF here comprises a question to clarify the first information I1, such as the journey information FI. That is to say that the intermediate question ZF in this case comprises a question concerning the journey route FS. By way of example, the intermediate question ZF comprises a question to the user of the motor vehicle 1 regarding whether an interruption to the journey along the route is wanted.

In a subsequent step B2, the mobile electronic device 2 records at least one further piece of first information I11, which is representative of at least one further piece of journey information WFI. By way of example, the user of the motor vehicle 1 inputs the further first information I11 into the mobile electronic device 2. The user of the motor vehicle 1 inputs for example that an interruption to the journey along the route is wanted and clarifies the interruption to the journey along the route by indicating a piece of location-related interruption information.

If the collective information $I_G$ is above the predefined information threshold $I_{Thr}$, the preparatory information VI is determined in a further step B3 on the basis of the first information I1, the second information I2, the third information I3 and the further first information I11. Here, the preparatory information VI is displayed on the electronic device 2 on the basis of the arrival location, the arrival time, the battery charge, the power consumption, the tire pressure, the present location, the weather forecast and the location-related interruption information.

LIST OF REFERENCE SIGNS 1 motor vehicle
2 mobile electronic device
3 battery
4 external apparatus
5 sensor unit
6 apparatus
7 telecommunication unit of the apparatus
8 telecommunication unit of the mobile electronic device
9 navigation apparatus
I1) first information
I11) further first information
I2) second information
I3) third information
FI) journey information
IZ) actual state
SI) path information
VI) preparatory information
ZF) intermediate question
WFI) further journey information
$I_{Thr}$) information threshold
$I_G$) collective information

The invention claimed is:

1. A method for preparing a motor vehicle for a journey, comprising:
 recording, using a mobile electronic device, at least one piece of first information, which is representative of at least one piece of journey information, before the journey, ascertaining a piece of second information that is representative of at least one actual state of the motor vehicle, determining whether the at least one piece of first information exceeds a predetermined threshold, said predetermined threshold including an arrival location, an arrival time, and at least one further piece of journey information that is not arrival location or arrival time information;

responsive to a determination that the at least one piece of first information reaches the predetermined threshold, determining at least one piece of preparatory information on the basis of the first information and the second information, and displaying the preparatory information on the mobile electronic device in order to prepare the motor vehicle.

2. The method as claimed in claim 1, further comprising:

obtaining a piece of third information that is representative of at least one piece of path information, and wherein determining the at least one piece of preparatory information further comprises determining the at least one piece of preparatory information on the basis of the third information.

3. The method as claimed in claim 2, wherein the path information comprises one or more of the following pieces of information: traffic data, and weather data.

4. The method as claimed in claim 1, wherein the preparatory information comprises a route for the journey, and the route for the journey is provided to a navigation apparatus of the motor vehicle.

5. The method as claimed in claim 1, wherein the mobile electronic device is not integrated in the motor vehicle, and the mobile electronic device is not embedded in the motor vehicle.

6. The method as claimed in claim 1, further comprising:

responsive to a determination that the at least one piece of first information does not reach the predetermined threshold, determining at least one intermediate question when determining the preparatory information, outputting the intermediate question using the mobile electronic device, recording, using the mobile electronic device, at least one further piece of first information, and determining the preparatory information on the basis of the first information, the second information and the at least one further piece of first information.

7. The method as claimed in claim 6, further comprising recording by voice input, using the mobile electronic device, at least one of the journey information and the further journey information.

8. The method as claimed in claim 1, further comprising recording by voice input, using the mobile electronic device, the journey information.

9. The method as claimed in claim 1, wherein the journey information comprises one or more of the following pieces of information: departure information, arrival information, information about an interruption to the journey, and route information.

10. The method as claimed in claim 9, wherein the second information comprises one or more pieces of information about the following parameters of the motor vehicle: battery charge, fuel fill level, effective power consumption, effective fuel consumption, tire pressure, interior temperature, existing accessories, and location data.

11. The method as claimed in claim 1, wherein the second information comprises one or more pieces of information about the following parameters of the motor vehicle: battery charge, fuel fill level, effective power consumption, effective fuel consumption, tire pressure, interior temperature, existing accessories, and location data.

12. The method as claimed in claim 1, wherein the preparatory information is correlated to increasing a range of the motor vehicle for the journey other than through refueling or recharging.

13. An apparatus for preparing a motor vehicle for a journey, wherein the apparatus is configured to carry out the method as claimed in claim 1.

14. The apparatus as claimed in claim 13, further comprising a sensor unit configured to ascertain the actual state of the motor vehicle.

15. A motor vehicle that includes the apparatus as claimed in claim 13.

16. A computer-readable storage medium storing instructions that, when executed by a computer, cause said computer to perform the method as claimed in claim 1.

17. A method for preparing a motor vehicle for a journey, comprising:

receiving at a server external to the vehicle at least one piece of first information recorded using a mobile electronic device, which is representative of at least one piece of journey information, before the journey, ascertaining a piece of second information that is representative of at least one actual state of the motor vehicle, determining at the server whether the at least one piece of first information exceeds a predetermined threshold, said predetermined threshold including an arrival location, an arrival time, and at least one further piece of journey information that is not arrival location or arrival time information;

responsive to a determination that the at least one piece of first information reaches the predetermined threshold, determining at least one piece of preparatory information on the basis of the first information and the second information, and providing from the server to the mobile electronic device the preparatory information for display on the mobile electronic device in order to prepare the motor vehicle.

18. An apparatus for preparing a motor vehicle for a journey, wherein the apparatus is configured to carry out the method as claimed in claim 17.

* * * * *